United States Patent Office 3,608,121
Patented Sept. 28, 1971

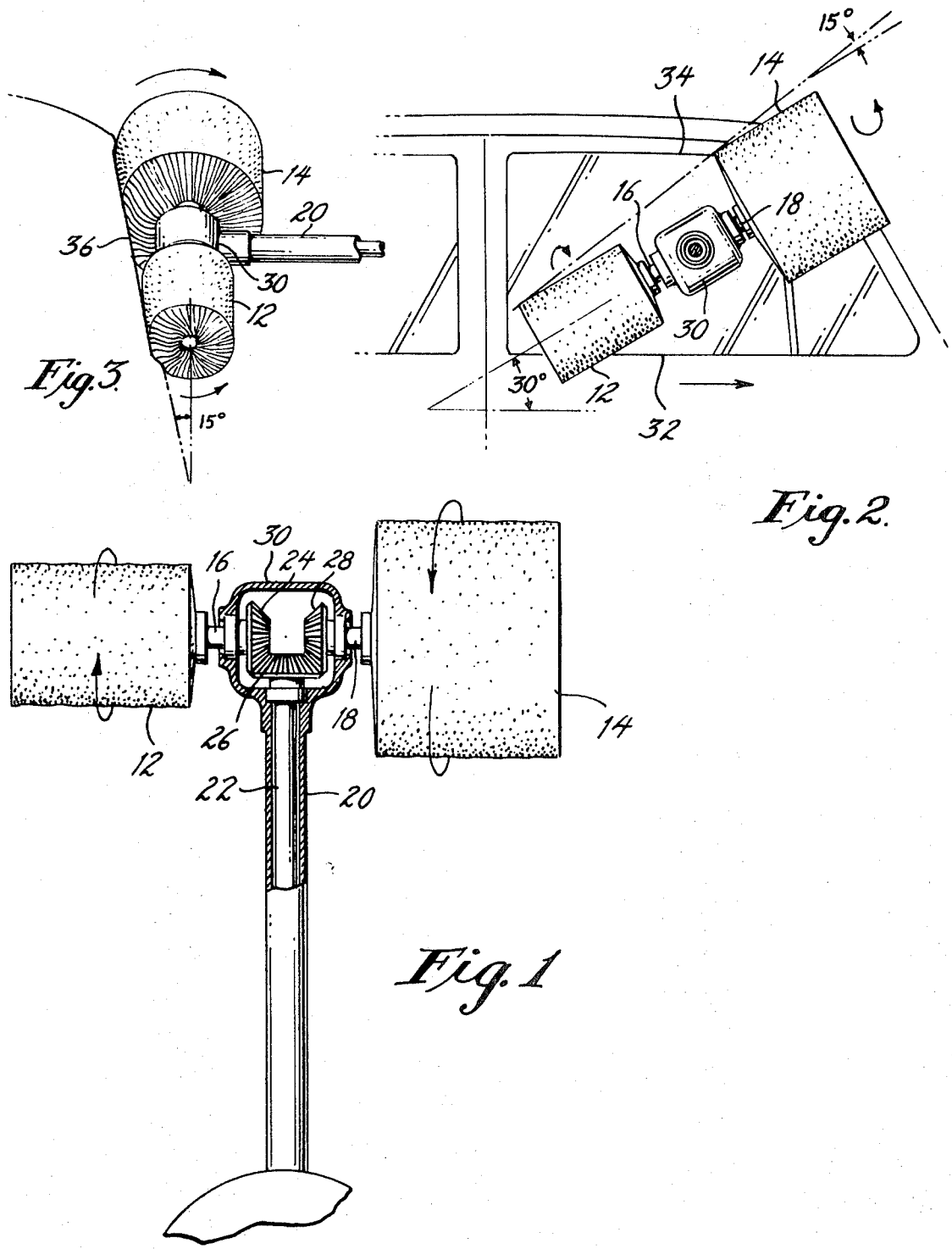

3,608,121
VEHICLE WASHER
Courtland N. Smith, Jr., Glen Ridge, and Sherman L. Larson, Palmyra, N.J., assignors to Sherman Car Wash Equipment Co., Palmyra, N.J.
Filed Mar. 10, 1969, Ser. No. 805,401
Int. Cl. B60s 3/06
U.S. Cl. 15—21                    3 Claims

ABSTRACT OF THE DISCLOSURE

A vehicle washing system having a rotating brush that is angularly displaced with respect to the direction of motion of the vehicle.

This invention relates to a vehicle washing system. More particularly, this invention relates to a vehicle washing system having a rotating brush that is angularly displaced with respect to the direction of motion of the vehicle. Preferably, the angular inclination will be between 15° and 60°. This will result in a rotating brush that will not harm antennas or mirrors on the vehicle but will effectively clean a relatively large area.

There is a need in the car wash industry for an effective window brush. Prior attempts to develop such a brush have been unsuccessful. The reason for this lack of success is that a satisfactory window brush must possess the following two characteristics. The brush must be able to effectively clean a large surface area, preferably the entire window. In addition, the brush must not damage antennas and mirrors which are closely located to the windows to be cleaned.

There are many window brush units in operation today wherein the rotating brush has a vertically oriented axis of rotation. This brush effectively cleans the entire window as the car is transported by the brush. However, the horizontal orientation of the brush fibers is likely to cause the elongated fibers to become entangled in a mirror or antenna lying within the brush's path of operation. Accordingly, because the brush will cause excessive antenna and mirror damage, it cannot be brought into contact with any window area adjacent an antenna or mirror. This withdrawal of the brush causes a significant portion of the window area to be missed. Also provisions must be made for the detection of mirrors and antennas so that the brush may be withdrawn before damage occurs.

Another type of brush in use today contains a rotating brush having a horizontally oriented axis of rotation. Because the elongated brush fibers are oriented parallel to a mirror and antenna, the elongated brush fibers may thread their way through the antenna and mirror with little danger of any entanglement. However, because the brush fibers are oriented perpendicularly to the direction of motion of the vehicle, the area of coverage against the side of the window is minimal. Therefore, although there is no damage to antenna and mirrors, the brush does not effectively clean the window.

Therefore, it is an object of this invention to provide a vehicle washer that will effectively clean the windows of a vehicle.

It is a further object of this invention to provide a vehicle washer wherein the window brush will not have to be withdrawn when an antenna or mirror is located in its path of operation.

Other objects will appear hereinafter.

In accordance with the invention, there is provided a vehicle washing system having a pair of rotating brushes that are angularly displaced with respect to the direction of motion of the vehicle to be washed. Alternatively, a single angularly displaced brush may be utilized. Preferably, the angular inclination will be between 15° and 60°.

The brushes rotate in opposite directions in order to effectively clean the window areas adjacent the upper and lower window edges. Furthermore, the upper rotating brush may be of a greater diameter than the lower rotating brush.

For the purpose of illustrating the invention, there is shown in the drawing a form which is presently preferred; it being understood, however, that the invention is not limited to the precise arrangements and instrumentalities shown.

FIG. 1 is a top view of the rotating brush assembly and the drive means therefor.

FIG. 2 is an elevated view of the brush assembly of FIG. 1 showing the brush assembly as applied to the window of a vehicle.

FIG. 3 is a top perspective view of the brush assembly of FIG. 1 as applied to the window of a vehicle.

Referring now to the drawings in detail, there is shown in FIG. 1 a rotating brush assembly and the drive means therefor. Rotating brush 12 is connected to gear 24 by means of shaft 16. Similarly, rotating brush 14 is connected to gear 28 by means of shaft 18. Gears 24 and 28 are both driven by gear 26. Gears 24, 26 and 28 are located within gear housing 30. Drive shaft housing 20 is integrally connected to gear housing 30. Drive shaft 22 is located within drive shaft housing 20. Drive shaft 22 drives gear 26. Drive shaft 22 may be driven by conventional motor means (not shown).

FIG. 2 shows the application of rotating brushes 12 and 14 to a conventional car window. It is to be understood, however, that the invention also has utility with respect to the cleaning of all surfaces and should not be restricted to car windows. As shown in FIG. 2, the preferred angle of inclination between the direction of motion of the vehicle and the axis of rotation of the brushes is about 30°.

Because the 30° inclination is not very steep, the elongated fibers of the brushes will be able to thread their way through any protruding antennas and mirrors without becoming entangled therein. Therefore, it is not necessary for the rotating brushes to be retracted whenever an antenna or mirror presents itself. Because it is not necessary to retract the brushes, no means need be provided to detect the presence of antennas and mirrors.

As is shown in FIG. 2, brush 12 rotates down against the window while brush 14 rotates up against the window. This enables brushes 12 and 14 to do an effective job of cleaning the window areas adjacent bottom ledge 32 and top ledge 34 respectively. If brush 12 did not rotate down against the window, bottom ledge 32 would prevent the brush fibers from cleaning the window area adjacent ledge 32. Similarly, if brush 14 did not rotate up against the window, top ledge 34 would prevent the brush fibers from cleaning the window area adjacent ledge 34.

Both brushes 12 and 14 are purposely designed to be lengthy in the longitudinal dimension. This results in a scanning action that will clean the entire window as the car is transported past the brushes.

FIG. 3 shows a top perspective view of the rotating brushes as applied to a vehicle contour designated as 36. Because rotating brush 14 has a greater diameter than rotating brush 12, the axis of rotation of the brushes will not be parallel with vehicle contour 36. As shown in FIG. 3, the angle of inclination between vehicle contour 36 and the axis of rotation of the brushes is about 15°.

The use of two brushes with one brush having a larger diameter than the other brush provides a very effective operation. However, it is to be understood, that it is not necessary that two rotating brushes of different diameters be employed. For example, two rotating brushes of the same diameter could be utilized.

From the foregoing, it should be apparent that applicant has invented a novel window brush arrangement that is both simple in design and effective in operation.

The present invention may be embodied in other specific forms without departing from the spirit or essential attributes thereof.

It is claimed:

1. A vehicle washing apparatus wherein a vehicle is moved in a predetermined direction past a cleaning station comprising a top brush and a bottom brush, said brushes being rotatable about an axis of rotation, a support, means mounting said brushes to said support so that said axis of rotation of said brushes is angularly inclined to said predetermined direction of motion of said vehicle, said angle of inclination being greater than ten degrees but less than sixty degrees, and means to rotate said top brush so that it upwardly sweeps the vehicle to be washed, and means to rotate said bottom brush so that it downwardly sweeps the vehicle to be washed.

2. A vehicle washer in accordance with claim 1 including a first gear for rotating said top brush, a second gear for rotating said bottom brush, and a third gear for directly contacting and rotating said first and second gears.

3. A vehicle washer in accordance with claim 1 wherein said top brush has a first diameter, said bottom brush has a second diameter, said top and bottom brushes being longitudinally displaced along said axis of rotation, said longitudinal displacement and said first and second diameters being so dimensioned that a line joining the lower periphery of said bottom brush to the lower periphery of said top brush will be inclined to said axis of rotation at an angle greater than ten degrees but less than twenty degrees.

References Cited

UNITED STATES PATENTS

| | | | |
|---|---|---|---|
| 1,570,465 | 1/1926 | D'Aprea | 15—23 |
| 1,697,534 | 1/1929 | Macready et al. | 15—23X |
| 3,090,981 | 5/1963 | Vani et al. | 15—21(C.3) |
| 3,238,551 | 3/1966 | Cirino et al. | 15—21(C.0) |
| 3,460,177 | 8/1969 | Rhinehart et al. | 15—21(C.0) |

OTHER REFERENCES

Auto Laundry News; February 1967; p. 21.
Auto Laundry News; April 1968; p. 2.

EDWARD L. ROBERTS, Primary Examiner